United States Patent [19]
Yamakawa et al.

[11] Patent Number: 4,660,114
[45] Date of Patent: Apr. 21, 1987

[54] THIN FILM MAGNETIC HEADS AND SUBSTRATES THEREFORE

[75] Inventors: Akira Yamakawa, Itami; Yoshinobu Takeda, Osaka; Eiji Kamijo, Itami, all of Japan

[73] Assignee: Sumitomo Electric Industries, Ltd., Osaka, Japan

[21] Appl. No.: 699,396

[22] Filed: Feb. 7, 1985

[30] Foreign Application Priority Data

Feb. 15, 1984 [JP] Japan ................................. 59-27719

[51] Int. Cl.$^4$ ........................... G11B 5/22; G11B 5/14
[52] U.S. Cl. .................................. 360/122; 360/110; 360/103; 360/126
[58] Field of Search ............... 360/126, 127, 103, 122, 360/110; 501/103, 105, 87, 89

[56] References Cited

FOREIGN PATENT DOCUMENTS 56-14474  2/1981  Japan ................................. 501/105
57-82172  5/1982  Japan .
57-135772  8/1982  Japan .
58-121179  7/1983  Japan ................................. 360/103

OTHER PUBLICATIONS

Rigby, I.B.M. Technical Disclosure Bulletin, vol. 25, No. 8, Jan. 1983, p. 4142.

Primary Examiner—Robert S. Tupper
Attorney, Agent, or Firm—Wenderoth, Lind & Ponack

[57] ABSTRACT

A novel thin film magnetic head is provided characterized by the use of a new substrate material excellent in mechanical property as well as machinability. This substrate is composed of a ceramic compact comprising 4 to 45% by volume of Component A, 55 to 96% by volume of Component B and at most 3% by volume of unavoidable impurities:

Component A: at least one member selected from the group consisting of carbides, nitrides, carbonitrides, carboxides, oxynitrides and carboxynitrides of Group IVa, Va and VIa elements of Periodic Table and mixtures or solid solutions thereof.

Component B: $ZrO_2$ consisting of at least 70% by weight of tetragonal and/or cubic system and the balance of monoclinic system, in which at least one member selected from the group consisting of oxides of Group IIIa elements of Periodic Table, CaO and MgO, and mixtures thereof is dissolved to form a solid solution.

2 Claims, 2 Drawing Figures

FIG. I (A)
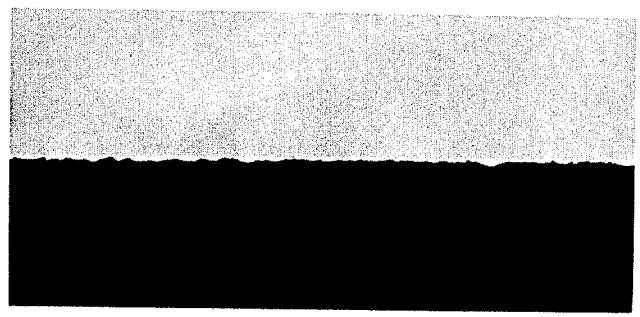
FIG. I (B)
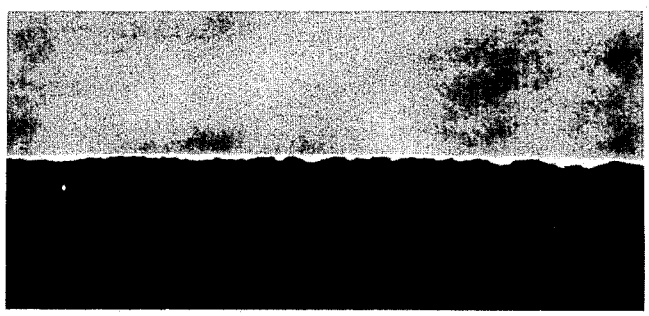

THIN FILM MAGNETIC HEADS AND SUBSTRATES THEREFORE

BACKGROUND OF THE INVENTION

1. Field of the Invention

This invention relates to a thin film magnetic head and more particularly, it is concerned with a substrate for a thin film magnetic head suitable for high recording density.

2. Description of the Prior Art

Generally, bulk heads composed of finely processed ferrite materials have been employed as a magnetic head for magnetic recording and reading. However, these magnetic heads have reached the limit in respect of the fine processing or machining and the permeability of ferrites to meet the lately rising demands for higher recording density and thin film magnetic heads have thus been developed. Some thin film magnetic heads have been put to practical use as a magnetic disk head for a large-sized computer, but their spread or diffused use has not been realized because of problems on the substrate material and low yield. The thin film magnetic head is generally prepared by sufficiently polishing the surface of a wafer with a suitable size, e.g. $50 \times 50$ to give a polished surface with a roughness of 50 Å and a smoothness of $1\mu$, coating the surface with $Al_2O_3$ and $SiO_2$ of several microns in thickness for the purpose of insulation, forming a predetermined magnetic circuit on the insulation film by sputtering or the like and then cutting a single head out. Therefore, for the mass production of such a thin film magnetic head, it is very important to find a substrate material excellent in machinability such as dimensional precision and surface smoothness in addition to the techniques of forming circuits and forming insulation films.

Up to the present time, ferrites and $Al_2O_3$-TiC ceramics have been examined as a substrate material and in particular, $Al_2O_3$-TiC ceramics have been considered most excellent in magnetic property, mechanical property, smoothening machinability, machining workability and uniformity of structure. However, in practice, these materials do not satisfy all of the machining workability, mechanical property and uniformity of structure, and particularly, they have such a problem that the working yield is lower. That is, ceramic materials having excellent mechanical properties and uniform structures are generally inferior in machinability so that they tend to meet with chipping in the step of slicing.

SUMMARY OF THE INVENTION

It is an object of the present invention to provide a thin film magnetic head for higher recording density, wherein the disadvantages of the prior art can be overcome by the use of a new substrate material.

It is another object of the present invention to provide a novel ceramic substrate for a thin film magnetic head, which is excellent in mechanical property as well as machinability.

It is a further object of the present invention to provide a substrate material for a thin film magnetic head, in particular, which is resistant to chipping during slicing.

These objects can be attained by a ceramic substrate for a thin film magnetic head, consisting of a ceramic compact comprising zirconia as a predominant component.

BRIEF DESCRIPTION OF THE DRAWINGS

The accompanying drawings are to illustrate the principle and merits of the present invention in greater detail.

FIG. 1(A) is a microphotograph showing the chipping state of a sliced surface in the ceramic substrate of the present invention.

FIG. 1(B) is a microphotograph showing the same of a commercially available $Al_2O_3$-TiC compact for comparison.

DETAILED DESCRIPTION OF THE INVENTION

We, the inventors, have made various efforts to find out a substrate material for a thin film magnetic head, having an excellent mechanical property and workability and consequently, have found a ceramic compact containing zirconia as a main component.

Accordingly, the present invention provides a substrate material for a magnetic thin film head, consisting of a ceramic compact comprising zirconia as a predominant component, and a thin film magnetic head using this substrate. In the present invention, in particular, the predominant structural phase consists of tetragonal $ZrO_2$ in which carbides, nitrides, carbonitrides, carboxides, oxynitrides or carboxynitrides of Group IVa, Va and VIa elements of Periodic Table are dispersed.

The substrate material of the present invention has a suitable hardness as well as an excellent mechanical strength and machinability and can thus be machined into a head with a high yield, while that of the prior art, consisting predominantly of $Al_2O_3$, has a higher hardness and an insufficient mechanical strength, thus meeting with a problem on machinability.

In a preferred embodiment of the present invention, a ceramic substrate for a thin film magnetic head comprises 4 to 45% by volume of Component A, 55 to 96% by volume of Component B and at most 3% by volume of unavoidable impurities:

Component A: one or more carbides, nitrides, carbonitrides, carboxides, oxynitrides and carboxynitrides of Group IVa, Va and VIa elements of Periodic Table and solid solutions thereof.

Component B: $ZrO_2$ consisting of 70% by weight or more of tetragonal and/or cubic system and the balance of monoclinic system, in which one or more of oxides of Group IIIa elements of Periodic Table, CaO and MgO are dissolved to form a solid solution.

$ZrO_2$ phase is the predominant phase in the ceramic composition of the present invention and should preferably be in a proportion of 55 to 96% by volume to the sintered compact thereof. If less than 55% by volume, the proportion of $ZrO_2$ is too small to keep the excellent machanical strength and machinability, while if more than 96% by volume, the hardness is lacking and the electroconductivity is lowered to cause static charges. The residual phase is a dispersed phase consisting of carbides, nitrides, carbonitrides, carboxides, oxynitrides and carboxynitrides of Group IVa, Va and VIa elements of Periodic Table. These can be in the form of mixtures or solid solutions of the two or more with the similar advantages.

Impurities incorporated unavoidably during the process should preferably be in a proportion of at most 3% by volume to keep the excellent properties.

Furthermore, $ZrO_2$ phase should preferably be of at least 70% by weight of tetragonal or cubic system, in which one or more of oxides of Group IIIa elements of Periodic Table, CaO and MgO are dissolved as a solid solution. If the monoclinic system is increased, microcracks are formed during cooling after sintering, thus resulting in marked lowering of the mechanical strength. Thus, 70% by weight or more of tetragonal or cubic system can give desired properties.

Preparation of a magnetic thin film head is carried out, for example, by hot-pressing and sintering a ceramic composition as set forth above to obtain a compact, working the compact into a wafer, polishing the wafer surface using a diamond wheel, coating the polished surface with $Al_2O_3$ or $SiO_2$ by vapor deposition, subjecting to slicing by means of a diamond wheel, forming a magnetic head circuit on the insulation film by sputtering, slicing and assembling into a magnetic head. When using the ceramic composition containing zirconia as a predominant component according to the present invention, chipping hardly takes place during slicing and a thin film magnetic head can be given in a high yield.

The following examples are given is order to illustrate the invention in detail without limiting the same.

EXAMPLE 1

A coprecipitated powder of $ZrO_2$- 3 mol % $Y_2O_3$ was mixed with 21% by weight (25% by volume) of TiC powder with a mean grain size of $0.1\mu$ measured by a microscope and hot-pressed at 1500° C. and 300 kg/cm$^2$ for 1 hour to obtain a zirconia compact with a theoretical density ratio of 100% and a mean grain size of $0.5\mu$.

The resulting compact and a commercially available $Al_2O_3$-TiC compact were machined into wafers, polished to give a surface roughness of 100 Å, coated with $Al_2O_3$ in a thickness of $10\mu$ by vapor deposition and then subjected to slicing using a diamond wheel. Consequently, it was found that the zirconia compact of the present invention had few voids as defects on the wafer surface after polishing and exhibited an excellent smoothness. As to the chipping of the edges by slicing, the zirconia compact showed 1 and $Al_2O_3$-TiC compact for comparison showed about 10, represented by a relative value of existence density of chippings of at least $10\mu$ occurring on the sliced surface. FIG. 1(A) and FIG. 1(B) show respectively the chipping states of both the compacts after slicing.

The zirconia compact wafer was provided with a magnetic head circuit by patterning, sliced and then assembled into a flying disk head which was then subjected to assessment of the characteristics as a magnetic head, while the comparative sample was similarly treated, thus obtaining results as shown in Table 1.

EXAMPLE 2

$ZrO_2$ powder and a dispersion phase component powder with a composition as shown in Table 1 were charged in an $Al_2O_3$ pot using $Al_2O_3$ balls with water, mixed and ground by wet process for 72 hours. The resulting slurry was dried and sintered at 1600° C. and 300 kg/cm$^2$ for 2 hours by a vacuum hot press. A sample was cut out of the thus resulting compact and then subjected to assessments of the transverse rupture strength, electroconductivity, hardness, smoothness of lapping surface, number of chippings occurring during slicing by a diamond wheel and crystalline systems. Sample Nos. 1–9 were thus treated to give results shown in Table 1. For comparison, the commercially available $Al_2O_3$-TiC substrate (Sample No. 10) was treated in the similar manner to give results shown in Table 1.

As is evident from these results, the substrates of the present invention are particularly more excellent in machinability.

TABLE 1

| Sample No. | Composition Stabilizer* | Composition Dispersed Phase** | Transverse Rupture Strength (kg/cm$^2$) | Electroconductivity ($\Omega^{-1}$ cm$^{-1}$) | Hardness (HRA) | Lapping Surface*** | Slicing Property**** | Crystalline Form I | Crystalline Form II | Crystalline Form III |
|---|---|---|---|---|---|---|---|---|---|---|
| 1 | 3Y$_2$O$_3$ | 25TiC | 150 | 10 | 92.0 | 2 | 2 | 5 | 95 | 0 |
| 2 | 8MgO | 25TiC | 75 | 10 | 91.5 | 5 | 4 | 10 | 50 | 40 |
| 3 | 10CaO | 25TiC | 70 | 10 | 91.5 | 5 | 6 | 15 | 50 | 35 |
| 4 | 3Y$_2$O$_3$ | 6TiC | 150 | $10^{-6}$ | 92.0 | 1 | 3 | 5 | 90 | 5 |
| 5 | 3Y$_2$O$_3$ | 30TiN | 140 | $10^2$ | 93.0 | 4 | 6 | 5 | 80 | 15 |
| 6 | 3Y$_2$O$_3$ | 30ZrN | 130 | 10 | 92.0 | 10 | 6 | 5 | 40 | 55 |
| 7 | 3Y$_2$O$_3$ | 30TiC$_{0.5}$O$_{0.5}$ | 130 | $10^{-2}$ | 93.5 | 10 | 3 | 5 | 85 | 10 |
| 8 | 3Y$_2$O$_3$ | 55TiC | 80 | $10^4$ | 95.0 | 50 | 100 | 15 | 70 | 15 |
| 9 | 3Y$_2$O$_3$ | 3TiC | 140 | $10^{-10}$ | 90.0 | 2 | 5 | 5 | 90 | 5 |
| 10 | Al$_2$O$_3$—25TiC | | 85 | 1.0 | 93.5 | 10 | 10 | | | |

Note:
*mole ratio of stabilizer contained in $ZrO_2$ starting material
**vol % of despersed phase (hard phase) contained in compact (calculated from density of $ZrO_2$ and dispersed phase)
***number of voids observed by SEM based on 10 of $Al_2O_3$—TiC
****number of chippings or cracks after slicing based on 10 of $Al_2O_3$—TiC
Crystalline Form I = monoclinic
II = tetragonal
III = cubic
Sample No. 10: Comparison

EXAMPLE 3

The procedure of Example 1 was repeated except using, as the hard phase, Ti$_{0.5}$W$_{0.5}$C, TiC$_{0.5}$N$_{0.5}$, TiO$_{0.3}$N$_{0.7}$ and TiC$_{0.5}$N$_{0.2}$O$_{0.3}$ instead of TiC and subjected to the similar assessment, thus obtaining the similar results, as shown in Table 2. It was found that these hard phases were also effective.

TABLE 2

| Sample No. | Hard Phase | Transverse Rupture Strength (kg/cm$^2$) | Electro-conductivity ($\Omega^{-1}$ cm$^{-1}$) | Hardness HRA | Lapping Surface | Slicing Property |
| --- | --- | --- | --- | --- | --- | --- |
| 11 | Ti$_{0.5}$W$_{0.5}$C | 150 | 10 | 92.5 | 2 | 2 |
| 12 | TiC$_{0.5}$N$_{0.5}$ | 150 | 10 | 92.5 | 3 | 3 |
| 13 | TaC | 140 | 10 | 92.0 | 2 | 3 |
| 14 | TiO$_{0.3}$N$_{0.7}$ | 150 | 1 | 92.5 | 3 | 3 |
| 15 | TiC$_{0.5}$N$_{0.2}$O$_{0.3}$ | 150 | 1 | 92.5 | 3 | 2 |

EXAMPLE 4

The sintered compacts obtained in Example 2 were worked into thin film magnetic heads and practically used as a flying disk head. Consequently, it was found that these thin film magnetic heads were favourably compared with that using the Al$_2$O$_3$-TiC substrate of the prior art in performances.

EXAMPLE 5

The procedure of Example 1 was repeated except not adding TiC, thus obtaining a thin film magnetic head with a similarly good performance.

According to the present invention, there can be obtained a substrate for a thin film magnetic head with a higher yield, which is excellent in mechanical properties as well as workability, and a thin film magnetic head using the same substrate, which performance can be favourably compared with that of the Al$_2$O$_3$-TiC substrate of the prior art.

What is claimed is:

1. A thin film magnetic head having a substrate consisting of a ceramic compact which comprises 4 to 45% by volume of Component A, 55 to 96% by volume of Component B and at most 3% by volume of unavoidable impurities:

Component A: at least one member selected from the group consisting of carbides, nitrides, carbonitrides, carboxides, oxynitrides and carboxynitrides of Group IVa, Va and VIa elements of the Periodic Table and mixtures or solid solutions thereof, Component B: ZrO$_2$ consisting of at least 70% by weight of tetragonal and/or cubic system and the balance of monoclinic system, in which at least one member selected from the group consisting of oxides of Group IIIa elements of the Periodic Table, CaO and MgO, and mixtures thereof is dissolved to form a solid solution.

2. A substrate for a thin film magnetic head, consisting of a ceramic compact which comprises 4 to 45% by volume of Component A, 55 to 96% by volume of Component B and at most 3% by volume of unavoidable impurities:

Component A: at least one member selected from the group consisting of carbides, nitrides, carbonitrides, carboxides, oxynitrides and carboxynitrides of Group IVa, Va and VIa elements of the Periodic Table and mixtures or solid solutions thereof, Component B: ZrO$_2$ consisting of at least 70% by weight of tetragonal and/or cubic system and the balance of monoclinic system, in which at least one member selected from the group consisting of oxides of Group IIIa elements of the Periodic Table, CaO and MgO, and mixtures thereof is dissolved to form a solid solution.

* * * * *